(12) United States Patent
Stanfill et al.

(10) Patent No.: US 6,654,907 B2
(45) Date of Patent: Nov. 25, 2003

(54) CONTINUOUS FLOW COMPUTE POINT BASED DATA PROCESSING

(75) Inventors: Craig W. Stanfill, Waltham, MA (US); Richard A. Shapiro, Arlington, MA (US); Stephen A. Kukolich, Lexington, MA (US)

(73) Assignee: Ab Initio Software Corporation, Lexington, MA (US)

( * ) Notice: Subject to any disclaimer, the term of this patent is extended or adjusted under 35 U.S.C. 154(b) by 385 days.

(21) Appl. No.: 09/731,234

(22) Filed: Dec. 5, 2000

(65) Prior Publication Data

US 2001/0042224 A1 Nov. 15, 2001

Related U.S. Application Data

(63) Continuation-in-part of application No. 09/608,995, filed on Jun. 30, 2000.
(60) Provisional application No. 60/169,097, filed on Dec. 6, 1999.

(51) Int. Cl.[7] ................................................ G06F 11/00
(52) U.S. Cl. .......................................... 714/16; 712/221
(58) Field of Search .............................. 714/16, 17, 51; 712/221, 228

(56) References Cited

U.S. PATENT DOCUMENTS 4,922,418 A * 5/1990 Dolecek ...................... 714/51
5,966,072 A * 10/1999 Stanfill et al. ............... 340/440
6,401,216 B1 * 6/2002 Meth et al. .................... 714/16

* cited by examiner

Primary Examiner—Scott Baderman
(74) Attorney, Agent, or Firm—Fish & Richardson P.C.

(57) ABSTRACT

A data processing system and method that provides two processes, checkpointing and compute point propagation, and permits a continuous flow of data processing by allowing each process to (1) return to normal operation after checkpointing or (2) respond to receipt of a compute point indicator, independently of the time required by other processes for similar responsive actions. Checkpointing makes use of a command message from a checkpoint processor that sequentially propagates through a process stage from data sources through processes to data sinks, triggering each process to checkpoint its state and then pass on a checkpointing message to connected "downstream" processes. A compute point indicator marks blocks of records that should be processed as a group within each process. A compute point indicator is triggered and sequentially propagates through a process stage from data sources through processes to data sinks without external control. Compute point indicators also effectively self-synchronize multiple data flows without external control. Use of compute point indicators rather than checkpoints avoids the time delay that saving state imposes, while permitting a continuous flow of data processing, including outputting results.

27 Claims, 13 Drawing Sheets

Data Queue

Input Data Queue

Output Data Queue

CONTINUOUS FLOW COMPUTE POINT BASED DATA PROCESSING

CROSS-REFERENCE TO RELATED APPLICATIONS

This application is a continuation-in-part application of and claims priority to U.S. application Ser. No. 09/608,995, filed on Jun. 30, 2000, which claimed priority to U.S. application Ser. No. 60/169,097, filed on Dec. 6, 1999.

TECHNICAL FIELD

This invention relates to data processing, and more particularly to a system, method, and computer program for continuous flow data processing.

BACKGROUND

With the huge popularity of the Internet for data access and electronic commerce comes a need for high-performance, fault tolerant "back-office" processing capabilities that allow large volumes of data to be processed essentially continuously and in near real-time (i.e., responding to a user's input within a few seconds to a few minutes). Such processing capabilities should be robust (i e., fault tolerant) to allow processing to continue where it left off after a failure. While such capabilities are useful for large-scale Internet-based data processing, they are often also applicable to conventional types of data processing over private networks and communication systems (e.g., airline reservation systems, internal corporate "intranets", etc.).

Achieving high performance for a particular volume of data often means using a parallel processing system to process the data within a reasonable response time. Numerous examples of parallel processing systems are known. For example, FIG. 1 is a block diagram of a typical prior art multi-process data processing system 100. Data from an ultimate source 101 (e.g., a web server) is communicated to at least one data queue 102. Data is read, or "consumed", from time to time by an initial process 104, which outputs processed data to one or more data queues 106, 106'. The process 104 typically is a single process that uses a two-phase commit protocol to coordinate consumption of input data and propagation of output data, in known fashion. Subsequent processes 108, 108' may be linked (shown as being in parallel) to provide additional processing and output to subsequent data queues 110, 110'. The data is finally output to an ultimate consumer 112, such as a relational database management system (RDBMS). In practice, such a system may have many processes, and more parallelism than is shown. Further, each process may consume data from multiple data queues, and output data to multiple data queues.

To obtain fault tolerance, such systems have used "checkpointing" techniques that allow a computational system to be "rolled back" to a known, good set of data and machine state. In particular, checkpointing allows the application to be continued from a checkpoint that captures an intermediate state of the computation, rather than re-running the entire application from the beginning. Examples of checkpointing systems are described in U.S. Pat. No. 5,819,021, entitled "Overpositioning System and Method for Increasing Checkpoints in Component-Based Parallel Applications", and U.S. Pat. No. 5,712,971, entitled "Methods and Systems for Reconstructing the State of a Computation", both assigned to the assignee of the present invention.

A problem with using traditional checkpointing techniques with data where essentially continuous data processing is desired (e.g., Internet data processing) is that checkpoints may only be created when the system is quiescent, i.e., when no processes are executing. Thus, every process would have to suspend execution for the time required by the process that requires the longest time to save its state. Such suspension may adversely impact continuous processing of data.

Accordingly, the inventors have determined that there is a need to provide for a data processing system and method that provides checkpointing and permits a continuous flow of data processing by allowing each process to return to operation after checkpointing, independently of the time required by other processes to checkpoint their state. The inventors have also determined that, in the context of continuous flow data processing, that there is a need for a method and system for intermittently inducing execution of computational processes and output of data without having to checkpoint the system, thus saving time while enabling execution of processes that necessarily operate on a quantity of data records (e.g., sorting or certain statistical processes). The present invention provides a method, system, and computer program that provides these and other benefits.

SUMMARY

The invention includes a data processing system and method that provides two processes, checkpointing and compute point propagation, and permits a continuous flow of data processing by allowing each process to (1) return to normal operation after checkpointing or (2) respond to receipt of a compute point indicator, independently of the time required by other processes for similar responsive actions.

In particular, checkpointing in accordance with the invention makes use of a command message from a checkpoint processor that sequentially propagates through a process stage from data sources through processes to data sinks, triggering each process to checkpoint its state and then pass on a checkpointing message to connected "downstream" processes. This approach provides checkpointing and permits a continuous flow of data processing by allowing each process to return to normal operation after checkpointing, independently of the time required by other processes to checkpoint their state. This approach reduces "end-to-end latency" for each process stage (i.e., the total processing time for data from a data source to a data sink in a process stage), which in turn reduces end-to-end latency for the entire data processing system. Importantly, once checkpointing has been initiated, it propagates through each process without external control in a self-synchronizing manner.

More particularly, this aspect of the invention includes a method, system, and computer program for continuous flow checkpointing in a data processing system having at least one process stage comprising a data flow and at least two processes linked by the data flow, including propagating at least one command message through the process stage as part of the data flow, and checkpointing each process within the process stage in response to receipt by each process of at least one command message.

In another aspect of the invention, a compute point indicator is triggered and sequentially propagates through a process stage from data sources through processes to data sinks. The trigger event may be an external or internal event, and is usually directly detected by a data source. Optionally, a detected trigger event may be routed through an external processor which then initiates a compute point process. Importantly, once compute point indicator propagation has been initiated, the indicator propagates through each process without external control. Compute point indicators are used to mark blocks of records that should be processed as a group within each process. When there are multiple data flows going into a process, compute point indicators also effectively self-synchronize the data flows without external control. Compute point indicators mark the boundaries between blocks of data records simply by existing. When a process receives a compute point indicator, it waits for the corresponding compute point indicator to be received on all of its input flows (if it has more than one input), then it does whatever blockwise computation function is appropriate for the component (e.g., sum or sort the data). The process then outputs the results of the computation. If the process is not a data sink, it also outputs the compute point indicator to any coupled downstream process. When a data sink receives a compute point indicator, it outputs whatever data it has available. Use of compute point indicators rather than checkpoints avoids the time delay that saving state imposes, while permitting a continuous flow of data processing, including outputting results.

More particularly, this aspect of the invention includes a method, system, and computer program for initiating processing of blocks of data within at least one flow of data input to a data processing system having a plurality of process stages, including at least one subscriber process stage, at least one publisher process stage, and optionally at least one intermediate process stage, the method including generating a compute point indicator in response to a trigger event; propagating the compute point indicator from each subscriber process stage through any intermediate process stages to each publisher process stage as part of the flow of data; and, for each process stage, processing a current block of data associated with the process stage in response to receipt by the process stage of at least one compute point indicator from an immediately previous process stage associated with the process stage.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Overview

Figure 1:
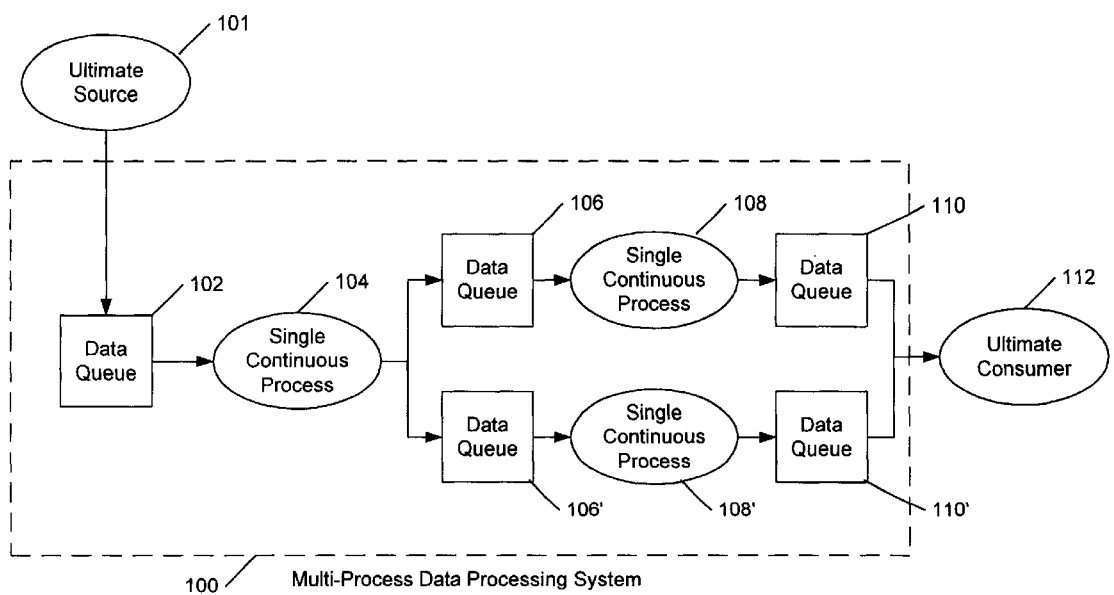
FIG. 1 is a block diagram of a prior art data processing system that may be used in conjunction with the present invention.
Figure 2:
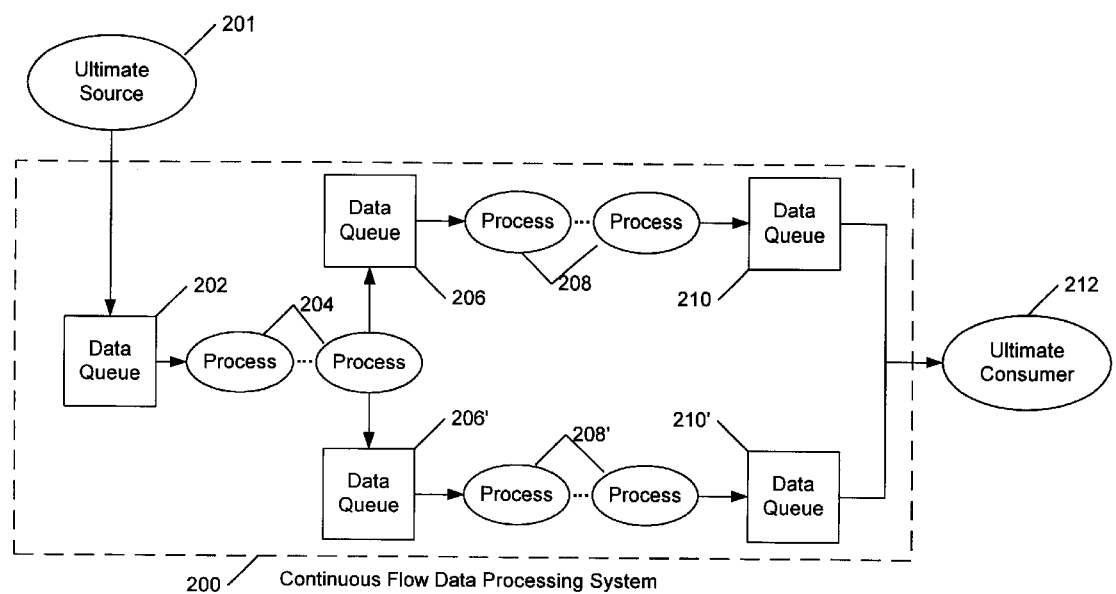
FIG. 2 is a block diagram of a continuous flow data processing system in accordance with the invention.

FIG. 2 is a block diagram of a continuous flow data processing system 200 in accordance with the invention. Data from one or more ultimate sources 201 (e.g., a web server) is communicated to at least one data queue 202 (for clarity, only one ultimate source 201 and one data queue 202 are shown). Data is read, or "consumed", from time to time by an initial process stage 204 of one or more parallel sets of sequentially linked processes, each of which outputs processed data to one or more data queues 206, 206'. Subsequent process stages 208, 208' may be linked (shown as being in parallel) to provide additional processing and output to subsequent data queues 210, 210'. The data is finally output to an ultimate consumer 212, such as a relational database management system (RDBMS). The entire set of processes forms an acyclic graph. Within a process stage, the processes being performed by each parallel set of linked processes is the same. In practice, such a system may have many process stages, and more parallelism than is shown. Further, each process may consume data from multiple data queues, and output data to multiple data queues.

Figure 3:
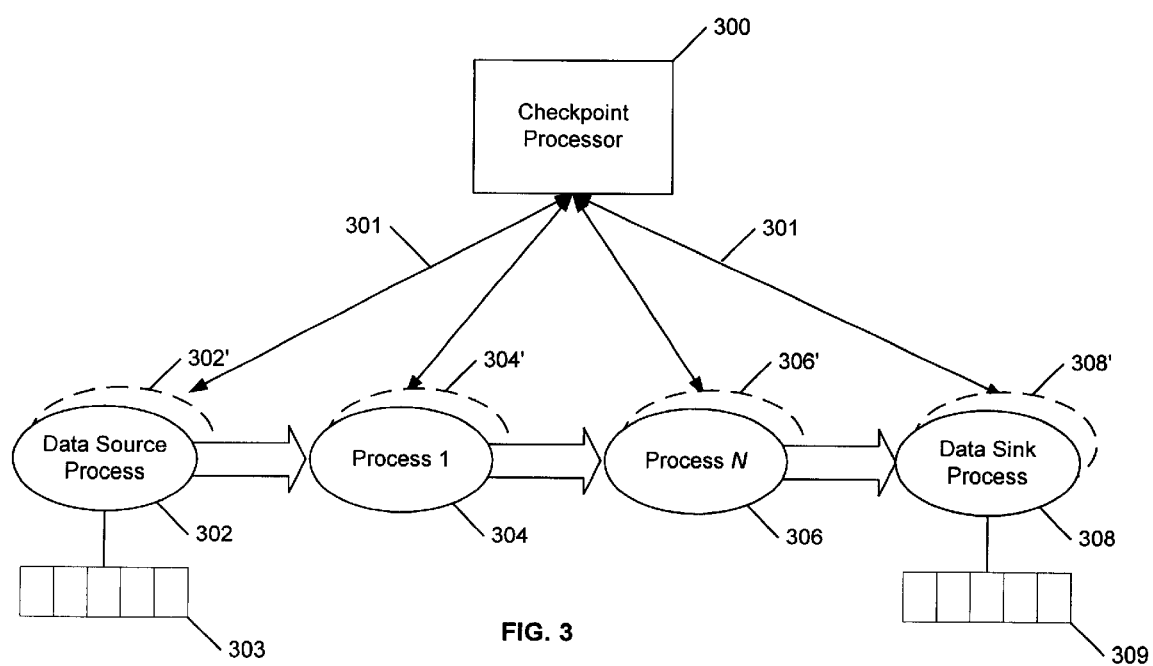
FIG. 3 is block diagram of one process stage in accordance with the invention.

FIG. 3 is block diagram of one process stage in accordance with the invention. Each process stage forms an acyclic graph. A Checkpoint Processor 300 is coupled by communication channels 301 to all data Sources 302, 302', and data Sinks 308, 308', and optionally to all intermediate Processes 304, 304' . . . 306, 306', comprising the process stage. Generally, all communication channels 301 are bi-directional.

Data Sources ("Sources") 302, 302' are processes that access associated data queues 303 for receiving and storing input data (e.g., user queries) and from which data can be read. Each Source can checkpoint the data in its data queue so that, upon a system failure, data subsequent to a checkpoint can be re-read.

Data Sinks ("Sinks") 308, 308' are processes that access associated data queues 309 for receiving processed data and from which data can be output or published (e.g., printed, displayed, or stored) from time to time. Each Sink can checkpoint the data in its data queue so that, upon a system failure, data subsequent to a checkpoint can be re-output.

Processes 304, 304' . . . 306, 306' directly or indirectly receive input from one or more Sources 302, 302' and ultimately output results to a Sink 308, 308'. A Process can checkpoint its data and processing state so that, upon a system failure, the state can be reconstructed and processing can continue from the last checkpoint without loss of data.

Initial parallel Processes 304, 304' within a stage may be coupled in parallel to multiple partitioned Sources 304, 304' that contain similar data types, and may also be coupled to multiple independent Sources that may contain dissimilar data types. Final parallel Processes 306, 306' within a stage may be coupled in parallel to multiple partitioned Sinks 308, 308', and may also be coupled to multiple independent Sinks. A Sink for one Process may be a Source for a subsequent process stage. Data flow is unidirectional, from Sources, through Processes, to Sinks. Processes optionally may be omitted, such that Sinks directly connect to Sources. Control messages that propagate through a stage do not bypass data, but are processed in sequential order of occurrence.

Figure 4:
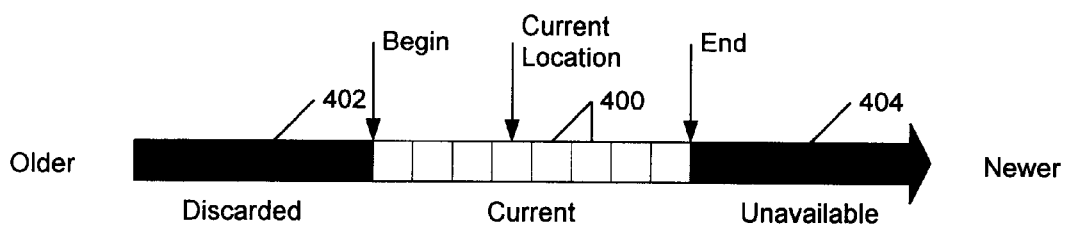
FIG. 4 is a diagram of a data queue suitable for use with the invention.

FIG. 4 is a diagram of a data queue suitable for use with the invention. Data records are stored in a logically linear queue, sequentially arranged from older to newer in time. The actual physical storage may be in a random access memory or on media. The queue is typically divided into a set of current records 400, discardable records 402, and unavailable records 404. Unavailable records 404 may be, for example, data records that have been received from an external source and stored, but not yet made available for processing. Discardable records 402 are records that have been consumed or published, but whose storage space has not yet been reclaimed.

A Current Location pointer may be used to indicate a current record. A "begin" pointer is typically used to demarcate discarded records from current records, and an "end" pointer is typically used to demarcate current records from unavailable records.

Continuous Flow Checkpointing

An important aspect of the invention is that checkpointing makes use of a command message from the Checkpoint Processor 300 that sequentially propagates through a process stage from Sources 302 through Processes 304, 306 to Sinks 308, triggering each process to checkpoint its state and then pass on a checkpointing message to connected "downstream" processes. This approach provides checkpointing and permits a continuous flow of data processing by allowing each triggered process to return to normal operation after checkpointing, independently of the time required by other processes to checkpoint their state. This approach reduces "end-to-end latency" for each process stage (i.e., the total processing time for data from a Source to a Sink in a process stage), which in turn reduces end-to-end latency for the entire data processing system 200. Thus, a graph can produce usable output while a job is still running. Importantly, once checkpointing has been initiated, it propagates through each process without external control in a self-synchronizing manner. Further, input data that was taken in at a time prior to the last saved state (a "committed checkpoint" in continuous flow terminology) may be safely deleted, because it will not be needed again by the graph.

Figure 6:
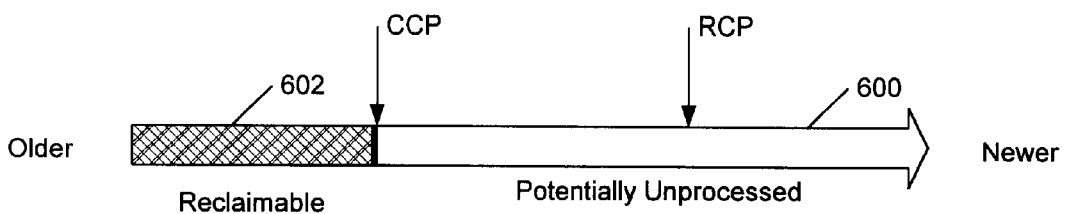
FIG. 6 is a diagram of an input data queue for a continuous flow checkpointing data processing system.
Figure 7:
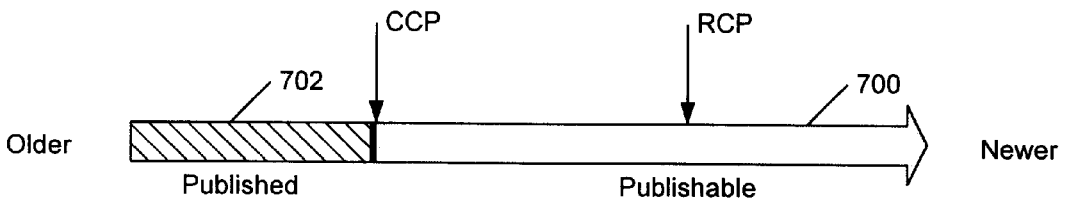
FIG. 7 is a diagram of an output data queue for a continuous flow checkpointing data processing system.

FIGS. 5A–5D are a flowchart showing one embodiment of a method for initiating a checkpoint in a process stage of a continuous flow checkpointing data processing system. FIG. 6 is a diagram of an input data queue for a continuous flow checkpointing data processing system. FIG. 7 is a diagram of an output data queue for a continuous flow checkpointing data processing system.

1. Checkpoint Processor:
   Step 500: Determines that a Checkpoint (CP) trigger event has occurred. A checkpoint may be triggered in a number of ways, as discussed below.
   Step 502: Generates a Checkpoint Request Message and transmits it to each Source. The Checkpoint Request Message includes values for a "Requested Checkpoint" (RCP) flag and a "Committed Checkpoint" (CCP) flag (Step 502). In the preferred embodiment, these values are numeric, and the RCP value is always greater than the CCP value. For example, initially, the respective values of the RCP and the CCP for a first checkpoint event might be "1, 0".

2. Sources—Upon receipt of a Checkpoint Request Message, each Source:
   Step 504: Either completes pending computations, or suspends any pending computations and saves them as part of checkpointing.
   Step 506: Deletes any previously existing Checkpoint Record that is older than the last checkpoint that was fully committed by the Checkpoint Processor 300 controlling the whole graph (this last committed checkpoint value is also included in the Checkpoint Request Message, and is not to be confused with the new checkpoint value corresponding to the new checkpoint being created), and optionally reclaims the associated storage space. When numeric values are used, records may be deleted that have a CCP tag or index that is less than the current CCP value. If numeric values are not used (e.g., Boolean flags are used) for the two checkpoint values, care must be taken to delete records corresponding to "old" Checkpoint Records before storing the current CCP value over an old CCP value. Although reclaiming Checkpoint Record storage may be done in a different order, deleting at this point in the process frees storage space up earlier rather than later.
   Step 508: Creates a Checkpoint Record in non-volatile storage (e.g., magnetic media, such as a hard disk drive) in sufficient detail to reconstruct the state of the Source as of the generation of the Checkpoint Record (i e., it "saves state"). Each Checkpoint Record includes the current "read" position in the Source's data queue, and is tagged or indexed with the RCP from the Checkpoint Request Message (e.g., with the value "1").
   FIG. 6 shows a pointer, RCP, to a data record in a queue of potentially unprocessed data 600 in an input data queue where the RCP Checkpoint Record event occurs. A second pointer, CCP, points to a data record separating potentially unprocessed data from data that had already been processed before a prior checkpointing event. Data records in the queue between the RCP and CCP pointers are part of the saved state. Note that for a subsequent checkpointing operation, the RCP pointer is treated as the prior CCP pointer value (this occurs automatically by using numeric values for RCP and CCP flags and making simple arithmetic comparisons of values).
   Step 510: Optionally, reclaims any storage space in the data queue that occurs before a saved data queue position, CCP, indicated by the current CCP value. Note that there may be multiple CCP pointers if multiple checkpointing operations are in progress concurrently. Using numeric values for RCP and CCP flags makes matching of corresponding pointers easier by using simple arithmetic comparisons.
   Step 512: Propagates a Checkpoint Message downstream to any Process that consumes data from the Source's data queue. The Checkpoint Message includes the RCP and the CCP from the original Checkpoint Request Message.
   Step 514: Resumes processing. Thus, while downstream processes are saving state, the Sources can receive data and perform any other application specific functions in preparation for providing data to Processes.

3. Processes—Upon receiving each Checkpoint Message, each Process:
   Step 516: Either completes pending computations, or suspends any pending computations and saves them as part of checkpointing (optionally, this step may be done after Step 520, to avoid having to save read but unprocessed records).
   Step 518: Saves each received Checkpoint Message in non-volatile storage.
   Step 520: Suspends reading from the Source that originated the received Checkpoint Message.
   Step 522: Upon receiving Checkpoint Messages from all connected Sources or upstream Processes (as determined from the saved Checkpoint Messages), deletes any previously existing Checkpoint Record that does not correspond to the current CCP value as indicated in the Checkpoint Request Message, and optionally reclaims the associated storage space.

Step 524: Creates a Checkpoint Record in non-volatile storage that includes the current processing state (including any read but unprocessed records), and which is tagged or indexed with the current RCP value.

Step 526: Propagates a Checkpoint Message "downstream" to any connected Process or Sink. Again, the Checkpoint Message includes the RCP and the CCP from the original Checkpoint Request Message.

Step 528: Resumes processing.

4. Sinks—Upon receiving Checkpoint Messages from all connected Processes or Sources, each Sink:

Step 530: Either completes pending computations, or suspends any pending computations and saves them as part of checkpointing.

Step 532: Deletes any previously existing Checkpoint Record that does not correspond to the current CCP value as indicated in the Checkpoint Request Message, and optionally reclaims the associated storage space.

Step 534: Creates a Checkpoint Record in non-volatile storage that includes the current "publishable" position in the Sink's data queue, and is tagged or indexed with the current RCP value (e.g., "1"). FIG. 7 shows a pointer, RCP, to a data record in a queue of publishable data 700 in an output data queue where the RCP Checkpoint Record event occurs. A second pointer, CCP, points to a data record separating publishable data from data that had already been published before a prior checkpointing event.

Step 536: Optionally, reclaims any storage space in the data queue that occurs before a saved data queue position, CCP, indicated by the current CCP value. Such data has already been published. Note that there may be multiple CCP pointers if multiple checkpointing operations are in progress concurrently. Using numeric values for RCP and CCP flags makes matching of corresponding pointers easier by using simple arithmetic comparisons.

Step 538: Causes any existing output that has not yet been published to be stored (buffered) in non-volatile storage, and tags the output with the current RCP value. Such output comprises the records in the queue between the RCP and CCP pointers.

Step 540: Transmits a Checkpoint Message to the Checkpoint Processor. Again, the Checkpoint Message includes the RCP and the CCP from the original Checkpoint Request Message.

5. Checkpoint Processor—Upon receiving Checkpoint Messages from all connected Sinks, the Checkpoint Processor:

Step 542: Updates or increments the stored value of the CCP variable, and stores the new CCP value in non-volatile storage (equivalently, the CCP variable is set to the current value of the RCP variable from the Checkpoint Messages). For example, if the respective values of the RCP and the CCP for a checkpoint event are "1, 0", the values will be "1, 1" after this step.

Step 544: Transmits the new CCP value to all Sinks.

6. Sinks—Each Sink:

Step 546: Publishes all buffered data tagged with an RCP value equal to the received new CCP value. In the illustrated example, such data comprises the records in the queue between the RCP pointer (corresponding to a value of "1") and the CCP pointer (corresponding to a value of "0") in FIG. 7.

Step 548: Resumes processing.

This ends the checkpointing process. Note that some steps may be done in a different order. For example, each Sink may resume processing (Step 548) either before publishing of buffered tagged data (Step 546), or after storing unpublished data (Step 538), with respect to data that becomes available after the RCP Checkpoint Record event occurs.

Recovery from a Failure

Figure 8:
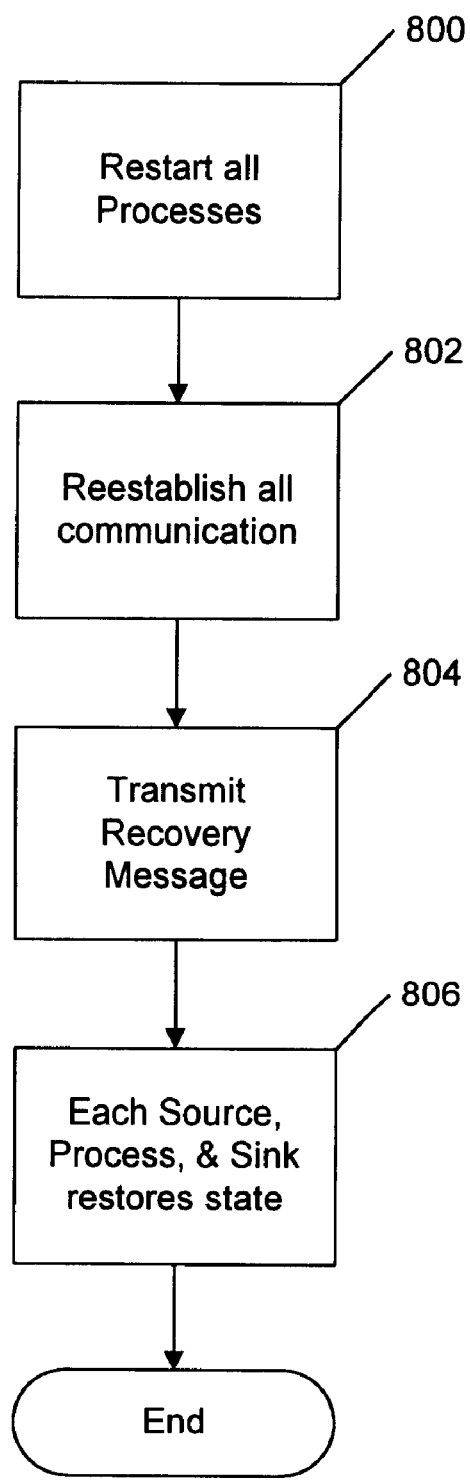
FIG. 8 is a flowchart of a method for recovery of state when a system failure occurs after a checkpointing event.

FIG. 8 is a flowchart of a method for recovery of state when a system failure occurs after a checkpointing event.

Step 800: Restart all Processes.

Step 802: Reestablish all communication links between Sources, Processes, Sinks, and the Checkpoint Processor.

Step 804: Transmit a Recovery Message, including the current CCP value, from the Checkpoint Processor to all Sources, Processes, and Sinks.

Step 806: Each Source, Process, and Sink restores its state as defined in its Checkpoint Record corresponding to the received CCP value. In particular:

Each Sink publishes data occurring before the position indicated by its Checkpoint Record corresponding to the received CCP value, and discards any data occurring after that position, taking care not to re-publish data that has already been published. This step may be necessary, for example, if a failure occurs after a Sink receives a new CCP value but before it has had time to publish its pending data records.

Each Source "rewinds" its read operation to the position indicated by its Checkpoint Record corresponding to the received CCP value.

Triggering a Checkpoint

Figure 9:
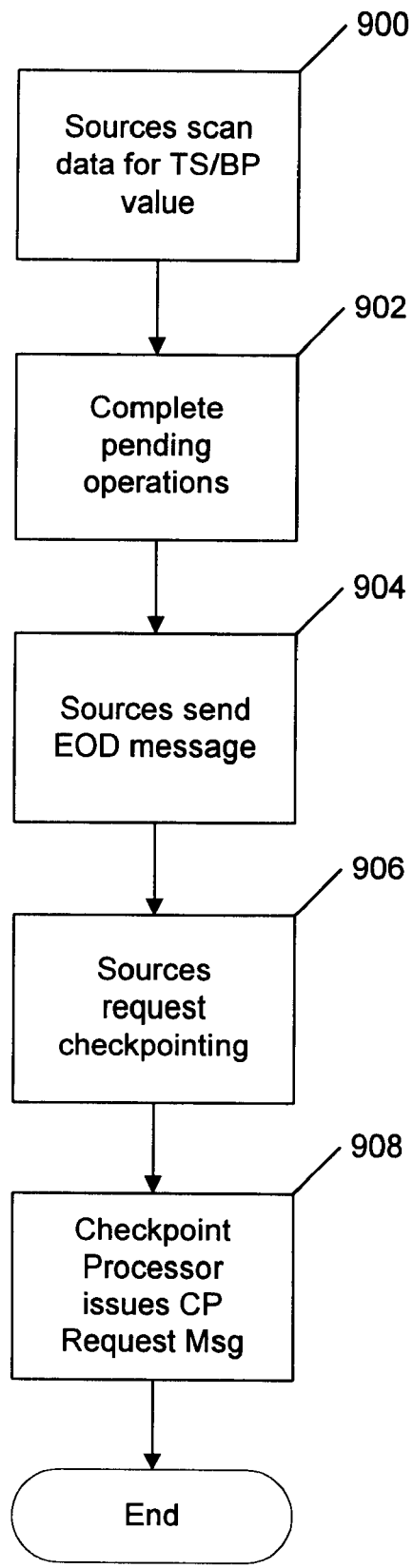
FIG. 9 is a flowchart of one method for coordinating checkpointing based on data values.

A checkpoint operation may be triggered in a number of ways. For example, checkpointing may be based on time and periodically performed, or it may be based on an external stimulus (e.g., a network operating system message of pending network shutdown). In one embodiment of the invention, checkpointing may be based on data values within or derived from records being processed. For example, the data records may include timestamps (TS) or breakpoint (BP) values. It may be desirable to checkpoint after completing computations for data with a particular timestamp for breakpoint value or range. FIG. 9 is a flowchart of one method for coordinating checkpointing based on pre-determined data values "known" to all processes (i.e., Sources, Processes, and Sinks):

Step 900: Each Source scans incoming data for the pre-determined TS/BP value. The following steps are performed once a triggering value is detected by at least one Source.

Step 902: Optionally, each Source completes pending computations.

Step 904: Optionally, each triggered Source sends an "End of Data" (EOD) control message to all outputs. This avoids certain deadlock scenarios where one Source detects a triggering TS/BP value and stops providing data records to a downstream Process. A second Source may not have reached a triggering TS/BP value but has filled its output buffer with data records for consumption by the downstream Process. The consuming Process connected to the two Sources may futilely wait until a next data record comes from the first Source (which has stopped providing new data), and never consume buffered data records from the second Source (which cannot reach a triggering TS/BP value in some yet-to-be-processed data record because its output buffer is full). Hence, deadlock results. By using an explicit EOD message, the downstream Process is instructed that no more data is coming from the first Source, and thus does not futilely wait for such data.

Step 906: Each Source sends a control message to the Checkpoint Processor, requesting checkpointing.

Step 908: When the Checkpoint Processor receives control messages from all Sources, it issues a Checkpoint Request Message and checkpointing progresses as described above.

An enhancement to the above process provides a procedure by which Sources and the Checkpoint Processor negotiate the initiation of checkpointing. This procedure may be useful where there must be a coordinated generation of output (e.g., certain aggregations of data should be produced before checkpointing) and there is no advance knowledge of what specific BP/TS values should be used as a checkpointing trigger. In such a case, the Checkpoint Processor can poll each Source to determine the current value of one or more fields which can be used to determine a timestamp or breakpoint based trigger. The Checkpoint Processor then determines a suitable global BP/TS value, and broadcasts that value to each Source. Processing then can proceed as described with respect to FIG. 9.

Another aspect of some embodiments of the invention is that they can reduce the overhead burden of checkpointing by coordinating checkpoint events with periodic production of output (e.g., aggregations that consume a number of records to produce one record). For example, it may be more efficient to aggregate and publish data and then run a checkpoint, so that the amount of state to save is reduced (e.g., less in-process data has to be saved). Accordingly, the issuance of Checkpoint Request Messages can be coordinated with publication of data reduction or aggregation operations. Such coordination may be set up by a programmer. Alternatively, coordination may be automatically triggered by having each Sink send a control message to the Checkpoint Processor after performing a data reduction or aggregation operation. The Checkpoint Processor can then initiate a checkpoint operation after receiving a control message from each Sink. As another alternative, a Checkpoint Message may be used to trigger publication of a data reduction or aggregation operation. That is, the Checkpoint Message serves as an indicator that all the data records in a group to be aggregated or reduced have been received.

Job Shutdown

It is preferable to use an explicit "Job Shutdown" procedure with embodiments of the invention of the type described above. Such a procedure insures that each process of the data processing system distinguishes an orderly shutdown of processing from a failure of an upstream process. One procedure that may be used is to have the Checkpoint Processor notify each Source to terminate processing. For example, the Checkpoint Processor may be notified to shutdown based on a schedule or from an external trigger, such as an operating system message. In turn, the Checkpoint Processor can initiate a checkpoint operation and send an "End of Job" (EOJ) message to all sources. A convenient way of sending the EOJ message is to tag a normal Checkpoint Request Message with an EOJ flag. On receiving an EOJ flag, each Source performs a normal checkpoint routine but exits instead of resumes operation.

As described above, each Source propagates a Checkpoint Message downstream. Each Process similarly performs a normal checkpoint routine and exits instead of resuming operation. When a Checkpoint Message propagates down to Sinks, each Sink similarly performs a normal checkpoint routine. However, each Sink only exits after the Checkpoint Processor returns a new CCP value and the Sink publishes pending data, as described above.

Early Publication

Figure 5A:
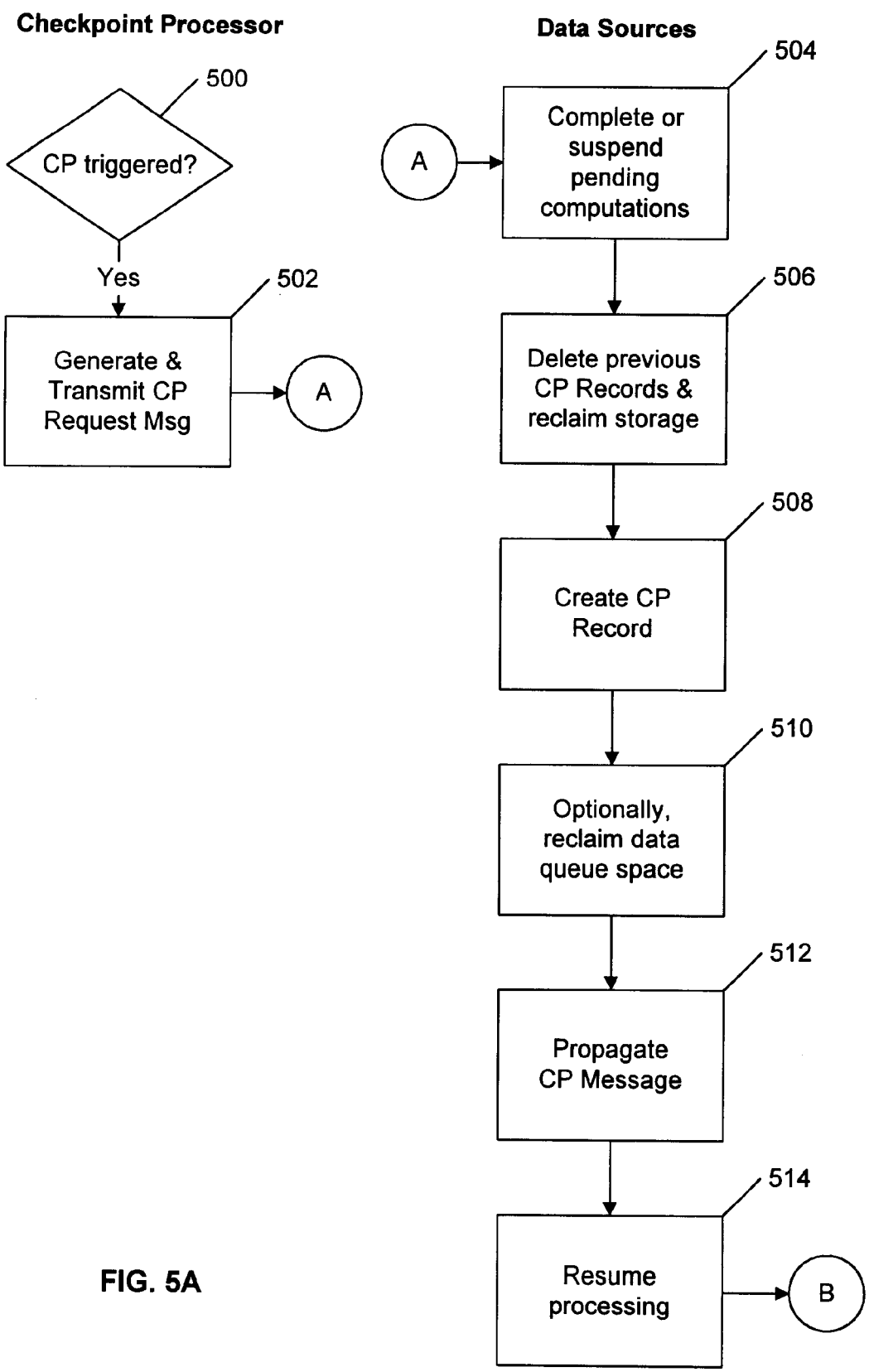
FIGS. 5A–5D are a flowchart showing one embodiment of a method for initiating a checkpoint in a process stage of a continuous flow checkpointing data processing system.
Figure 5B:
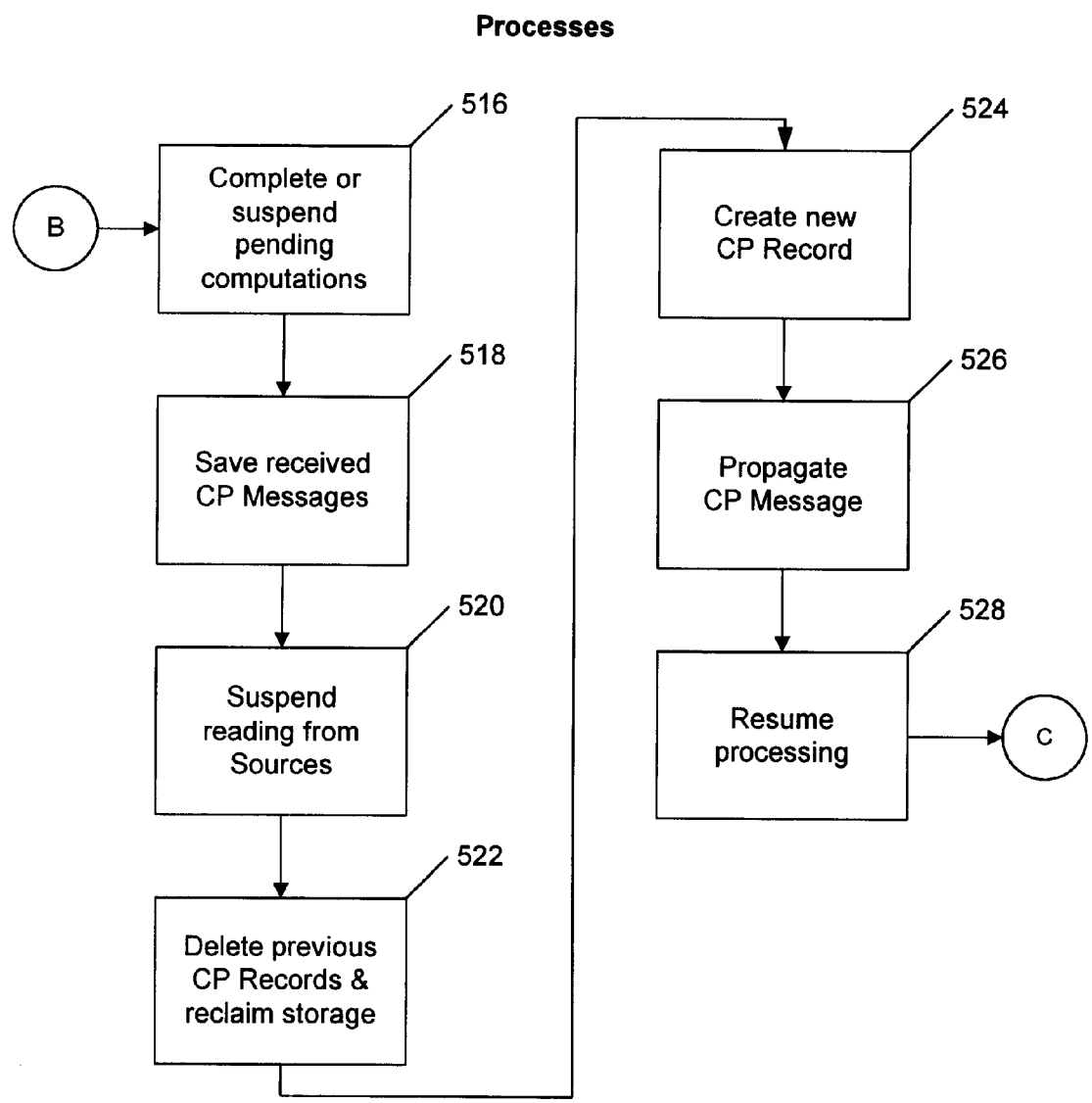
Figure 5C:
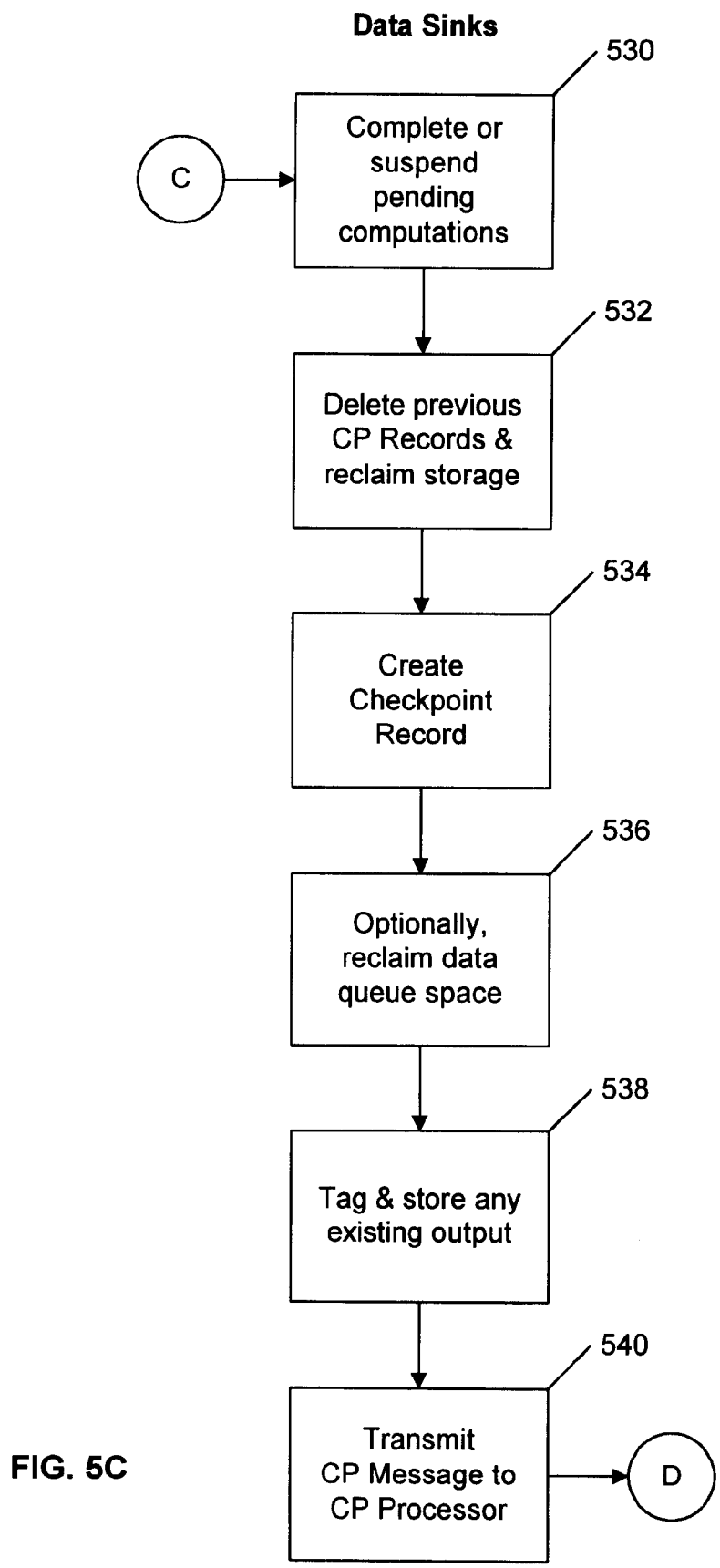
Figure 5D:
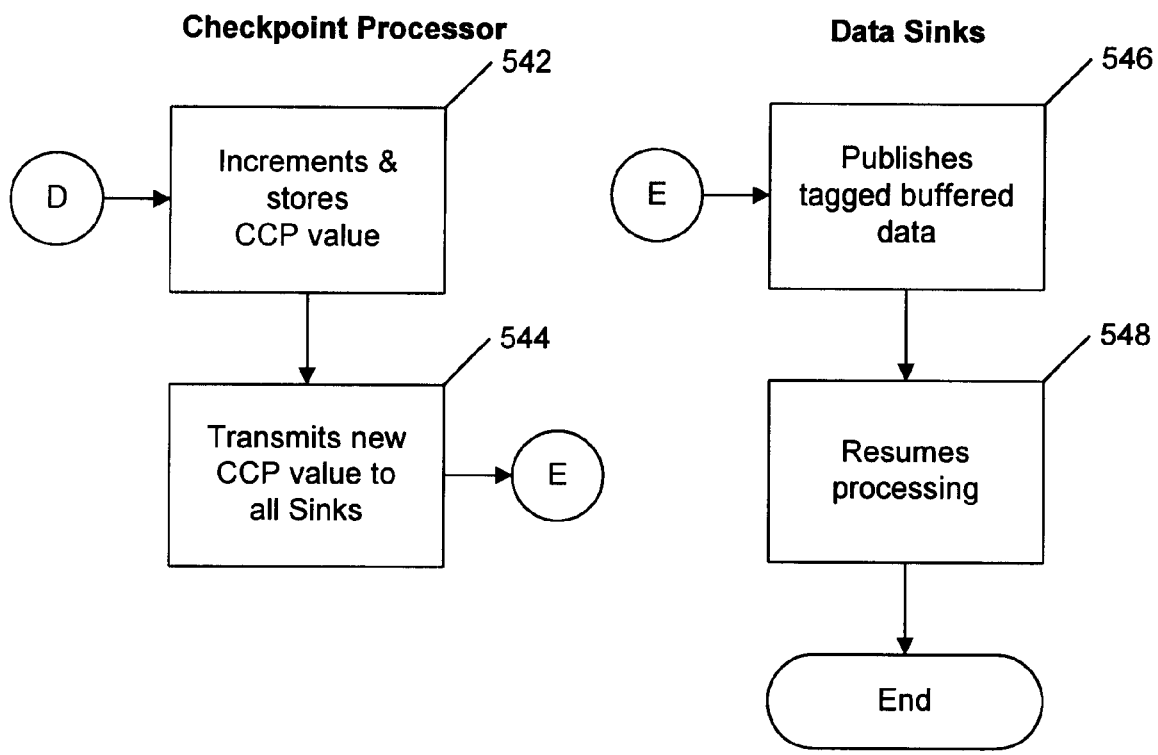

Under some circumstances, Sinks may publish data earlier than indicated in the procedure above. Early publication provides further improvements in end-to-end latency. For example, Sinks can publish data records early under the following conditions:

If pending unpublished record values are deterministic, then they may be published after Step 538 (FIG. 5C). "Deterministic" means that the same data records will be produced after a restart, although the order may differ. Whether this condition holds true is a property of each application, and is determined by a programmer. For a restart operation to recover from a failure, Sinks discard any recomputed data records that would overwrite data records that have been published early, so that duplicate records are not published.

If pending unpublished record values are deterministic AND ordered (i.e., they are monotonically increasing or decreasing), then they may be published at any time after receiving a checkpoint message. This shortens latency even more. Again, whether this condition holds true is a property of each application, and Sinks discard any recomputed data records computed during a restart that would overwrite data records that have been published early.

If republishing the same data records is acceptable, then they may be published at any time after receiving a checkpoint message. Such a situation may arise where timeliness is more important than exactness (e.g., real-time "hit" statistics).

Compute Point Indicators

As described above, continuous flow graphs are able to run indefinitely, and are able to constantly process new records to give new outputs after each checkpointing event. However, it is also useful to be able to intermittently induce execution of computational processes and output of data without having to checkpoint the system, thus saving time while enabling execution of processes that necessarily operate on a quantity of data records (e.g., sorting or certain statistical processes).

Accordingly, another aspect of the invention is use of "in stream" compute point indicators. Compute point indicators are extra packets of data that are effectively sent between records on data flow streams to a continuous flow data processing system 200. These indicators are preferably created by data sources, or subscribers, which can continually read input records, and are consumed by data sinks, or publishers, which can continually write new records.

Compute point indicators are used to mark blocks of records that should be processed as a group. Compute point indicators effectively mark the boundaries between blocks of data simply by existing. In addition, when multiple data flows converge as inputs to a component, compute point indicators also effectively synchronize the data flows by indicating which blocks of data correspond to which data flow. Importantly, once compute point indicator propagation has been initiated, the indicator propagates through each process without need for any external control or intervention.

Figure 10A:
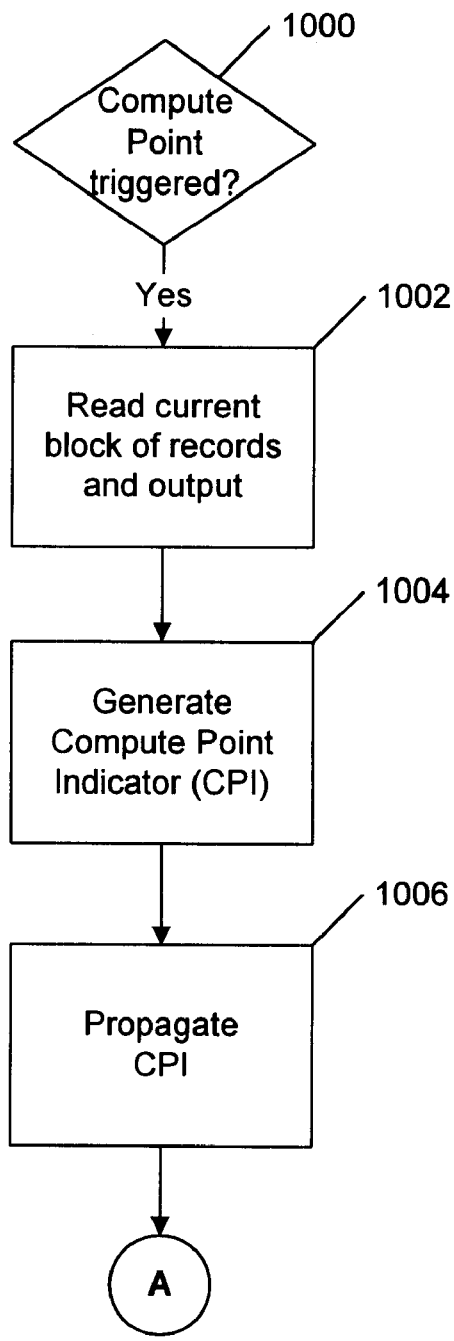
FIGS. 10A–10B are a flowchart showing one embodiment of a method for propagating a compute point indicator in a process stage of a continuous flow data processing system.
Figure 10B:
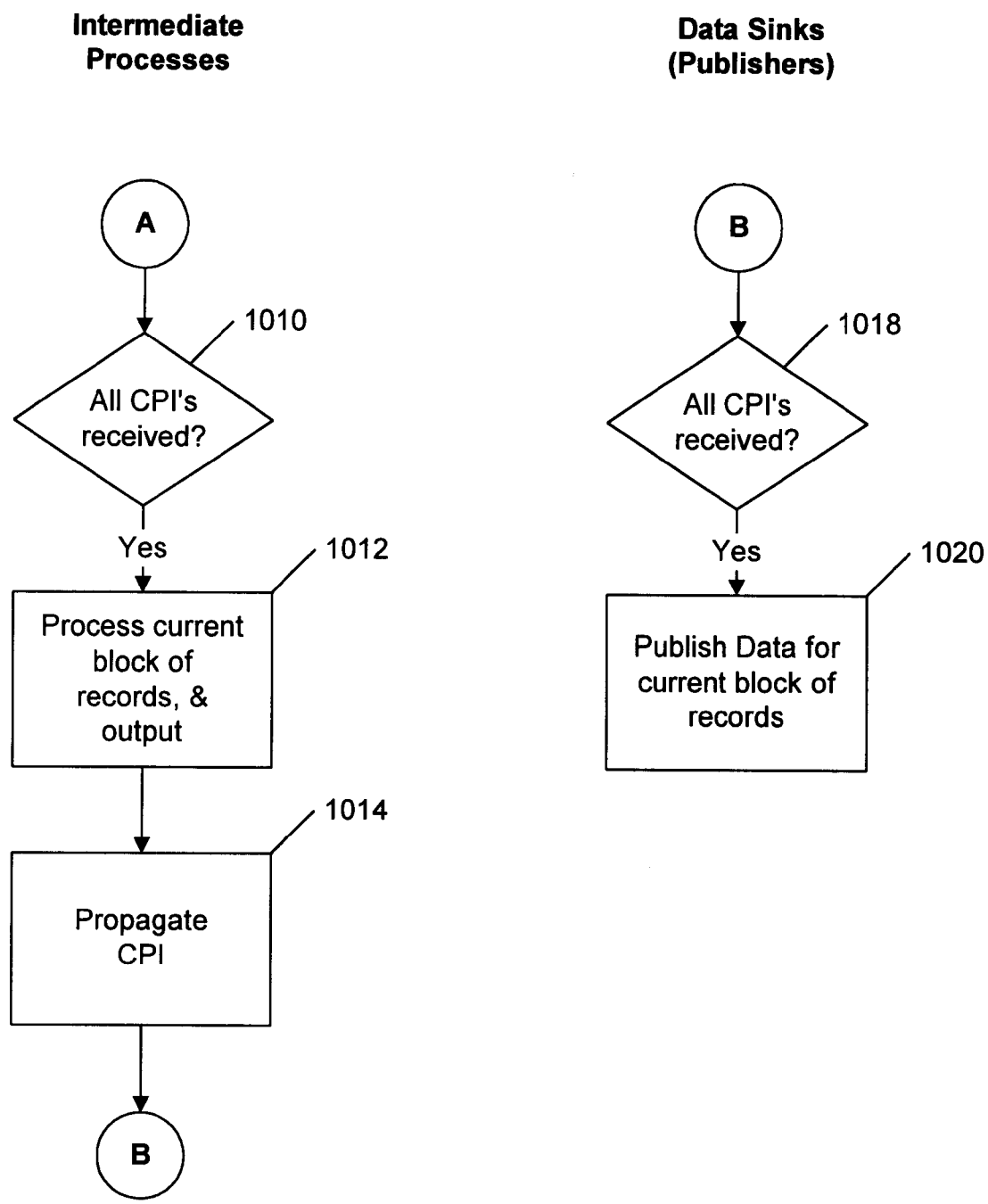

FIGS. 10A–10B are a flowchart showing one embodiment of a method for propagating a compute point indicator in a process stage of a continuous flow data processing system. To begin with, a compute point indicator (CPI) can be triggered by any of a variety of ways. For example, a CPI trigger event may be based on time and periodically performed, or it may be based on an external stimulus (e.g., user intervention). In one embodiment of the invention, triggering of a CPI may be based on data values within or derived from records being processed. For example, the data records may include timestamps (TS) or breakpoint (BP) values. It may be desirable to checkpoint after completing computations for data with a particular timestamp for breakpoint value or range.

In the preferred embodiment, each subscriber component determines if a compute point (i.e., a point in time for issuing a CPI) has been triggered (Step 1000). Each subscriber then reads a current block of data records and outputs the block to each directly connected subsequent ("downstream") intermediate process or publisher (Step 1002), and generates a CPI (Step 1004). The subscriber then propagates the CPI to each directly connected process (Step 1006).

In the preferred embodiment, each compute point is simply a data packet or record that can propagate through the components of a process stage. Preferably, each CPI includes a unique sequence number. All subscribers should issue compute point indicators in the same sequence. In addition, it is desirable that compute point indicators be generated by each subscriber at about the same time. Otherwise, a component that takes multiple inputs may spend much of its time simply waiting for a corresponding CPI on one of its inputs after having received a CPI on another input. Synchronization of CPI generation may be accomplished in a variety of manners, including issuance of a message by a triggered subscriber to a master processor (e.g., similar to the Checkpoint Processor 300 of FIG. 3), which sends notification messages to all other subscribers.

In one embodiment, the block of data records may be stored as one file in a continuous sequence of input files. As new data begins to accumulate after a compute point occurs (e.g., new entries in a web log), that data is written to a new file in the sequence. This new file becomes the next file processed after a next compute point (or a checkpointing event) is triggered. Each subscriber is configured to read the next file in sequence. Subscribers may also perform additional functions, such as formatting of data.

In an alternative embodiment, the order of Steps 1002 and 1004 can be switched. Further, a master processor (e.g., similar to the checkpoint processor 300 in FIG. 3) can determine whether a compute point has been triggered, and propagate a CPI to each subscriber, triggering the subscriber to read a current block of data records.

When an intermediate process component receives a CPI, it waits for a corresponding CPI (i.e., having the same sequence number) to be received on all of its input flows if it has more than one input (Step 1010). Each intermediate process then does whatever blockwise computation is appropriate for the process component (e.g., sum or sort) on the current data block output by a subscriber or prior ("upstream") intermediate process, and output the results of the computation (Step 1012). Each intermediate process then propagates the CPI to each downstream intermediate process or publisher (Step 1014).

When a publisher receives a CPI, it waits for a corresponding CPI (i.e., having the same sequence number) to be received on all of its input flows if it has more than one input (Step 1018). The publisher then outputs whatever data it has available (Step 1020).

The output data records are preferably stored as one file in a continuous sequence of output files. After the next compute point (or checkpointing event), published data is written to a new file in the sequence. Each publisher is configured to write to the next file in sequence. However, a variety of output modes can be used, including outputting to a queue or appending to a single file. In the preferred embodiment, each Publisher keeps track of which data records have been published, so that data is not republished inadvertently. Publishers may also perform additional functions, such as formatting of data.

Checkpoint messages also have the same functionality as compute point indicators, in that they also force computations to be done and data to be output. However, checkpoint messages have a greater impact on system performance than compute point indicators, because they are much more likely to cause a brief slow-down in the graph system while the graph waits for state data to be written to storage. Thus, it may be desirable to generate checkpointing events relatively infrequently (generally not more often than once every few minutes). Compute point indicators may be generated as frequently as desired for triggering processing of a current block of data. As one example, in a particular configuration, as many as 1,000 computer points per second have been generated.

Examples of CPI Triggers

Following are some choices for triggering generation of a compute point indicator in a practical embodiment. Preferably, each choice is made by simply selecting a parameter for each subscriber process component. Alternative methods of triggering a compute point indicator (including the same methods for triggering checkpointing) may also be used.

none—No CPIs are ever sent. This mode allows the subscriber component to be used in ordinary non-continuous graphs, to read data files in one of the continuous formats.

infile-boundary—A CPI is issued when a "true" end-of-file has been detected. A "true" end-of-file (EOF) usually means that incoming data is being written to a new sequential file. Waiting for more data to be appended to a current file does not count as a "true" EOF, because data tends to dribble through a continuous process, thus ordinary EOFs can be seen at random times depending on when processes are allocated (CPU) run time by the computer.

record-count—Every time a fixed number of new records is passed to the out port of the subscriber, those records are followed by a CPI. The constant fixed number is determined by a "compute point-interval" parameter.

time-interval—CPIs are sent every time a new time interval has passed. The time interval may be determined, for example, by an environment variable which gives an integer number of seconds.

data-driven—This mode uses user-written functions to determine when to send CPIs.

Graph Buffering

Large continuous flow graphs may be difficult to design and debug, and checkpointing such a graph may result in a relatively long end-to-end latency. Accordingly, it may be useful to break up a large graph into several smaller continuous flow graphs that communicate data to one another. Each smaller graph may be checkpointed independently of the other graphs at different intervals. Further, using inter-communicating graphs allows computational resources to become disconnected, without losing the ability to obtain output information.

In the preferred embodiment, first-in-first-out "graph queues" are used to buffer data between continuous flow graphs. The buffering may be accomplished by means of disks or similar non-volatile storage devices. Graph queues also provide a good way to get data into and out of a continuous flow graph.

Figure 11:
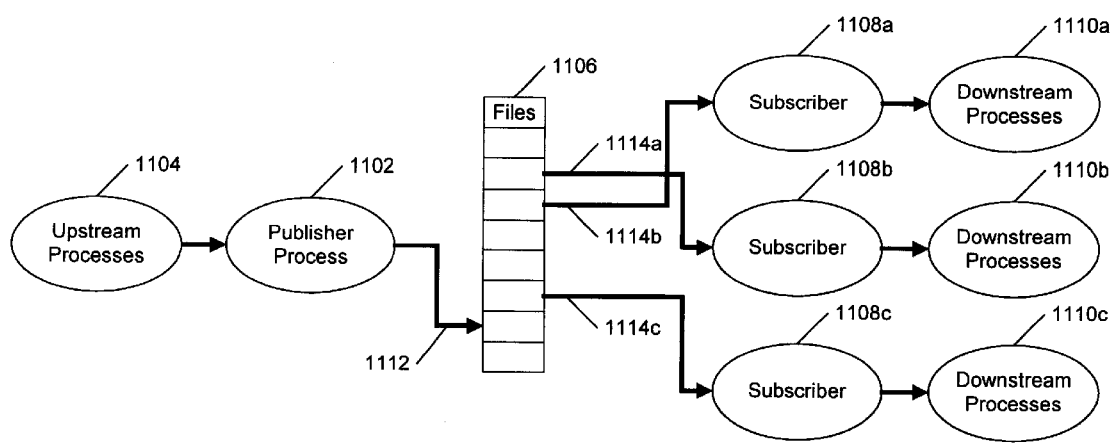
FIG. 11 is a diagram of two continuous flow data processing graphs connected by a first-in, first-out graph queue.

FIG. 11 is a diagram of two continuous flow data processing graphs connected by a first-in, first-out graph queue. A publisher process 1102, coupled to upstream graph processes 1104, writes data to a graph queue 1106, which preferably comprises a set of sequential files in a hierarchical directory structure (described in more detail below). One or more subscriber processes 1108a–1108c can read from the graph queue 1104. Each subscriber process 1108a–1108c provides data records to respective downstream graph processes 1110a–1110c.

An important feature of graph queues is reliability. In the preferred embodiment, a graph queue includes not only data record files but cursor files associated with each subscriber process. Each cursor file indicates for its associated subscriber process exactly where the last record was read, for that particular subscriber). For the whole queue there is just one "write" cursor, which indicates the position of the last record written to for every publisher and subscriber process accessing the queue. The cursor information may conveniently be expressed as a generation number (i.e., the current sequence number in a set of data files), and a byte offset from the beginning of a data file. During checkpointing, this cursor information is saved by subscriber and publisher components. As long as graph queues are used for inputs and outputs for a graph, with very rare exception, the graph can always be automatically restarted from the last checkpoint since the exact read and write cursor positions for each data file are stored as part of the checkpoint data. If ordinary data files are used, there is a greater chance of getting repeated data (unless a user intervenes), because a process crash might occur between two critical writes to storage.

Referring to FIG. 11, a write cursor 1112 tracks the current write position (i.e., a record position within a data file) in the graph queue 1106. When the publisher process 1102 finishes writing a record to the file indicated by the current write position, the value of the write cursor 1112 is incremented to indicate the next write position (i.e., the next record position in the data file) has become the current write position in the graph queue 1106. Similarly, one or more read cursors 1114a–1114c track the current read position (i.e., a record position within a data file) in the graph queue 1106 for corresponding subscriber processes 1108a–1108c.

Graph Queue Directory Structures

As noted above, graph queues comprise data files stored on non-volatile storage devices. In the preferred embodiment, each graph queue comprises a hierarchical data directory structure, for ease of use. Conceptually, a publisher writes a sequence of data files, each containing data records, to a main directory. Each compute point (or checkpoint) indicator causes the publisher to make available (publish) any blocks of data it has received since the last compute point (or checkpoint) indicator. In order to maintain a sequence for such files in the preferred embodiment, an integer generation number is used as the file name extension. The generation number is incremented after each block of data is published, and the publisher can begin writing records to a new data file. Further, conceptually, the "current" published data file in the main directory is copied into a set of subdirectories, one for each subscriber, and the copy of the file in the main directory is removed. Each subscriber (possibly each in different graphs) can then read and delete from its "current" data file as needed independently of other subscribers. Following is an example of what a conceptual graph queue directory hierarchy might look like:

```
queue_top/           # top level or main queue directory
   data.00000006     # data file being written by publisher, but not yet
                     # made available to subscribers
subscribe.sub1/      # first subscriber directory
   data.00000003     # data file being read
   data.00000004     # data file not yet read
   data.00000005     # data file not yet read
subscribe.sub2/      # second subscriber dir.
   data.00000002     # data file being read
   data.00000003     # data file not yet read
   data.00000004     # data file not yet read
   data.00000005     # data file not yet read
```

The preferred embodiment improves upon this conceptualization in two ways. First, instead of physically copying each data file to each subdirectory, a link (e.g., a UNIX hard link) is created within each subdirectory to the file located in main directory. This means that there will be only one copy of each actual published data file on the storage device, with multiple references to it. When all of the reference links to an actual data file are deleted, the operating system may delete the actual file.

Second, separate cursor files in created in the main directory and in each of the subscriber subdirectories, containing cursor information as described above. Thus, the read position of each subscriber for its "current" data file can be saved as part of checkpointing. Following is an example of what an improved graph queue directory hierarchy might look like:

```
queue_top/           # top level or main queue directory
   cursor            # write cursor file
   data.00000002     # published data file
   data.00000003     # published data file
   data.00000004     # published data file
   data.00000005     # published data file
   data.00000006     # data file being written by publisher, but not yet
                     # made available to subscribers
subscribe.sub1/      # first subscriber directory
   cursor            # sub1 subscriber read cursor file
   link.00000003     # link to data file being read
   link.00000004     # link to data file not yet read
   link.00000005     # link to data file not yet read
subscribe.sub2/      # second subscriber dir.
   cursor            # sub2 subscriber read cursor file
   link.00000002     # link to data file being read
   link.00000003     # link to data file not yet read
   link.00000004     # link to data file not yet read
   link.00000005     # link to data file not yet read
```

Note that the first subscriber directory has deleted its link to the data file data.00000002, since the first subscriber has finished reading records from that data file.

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on one or more programmable computer systems each comprising at least one processor, at least one data storage system (including volatile and non-volatile memory and/or storage elements), at least one input device or port, and at least one output device or port. The program code is executed on the processors to perform the functions described herein.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer system, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the present invention have been described. Nevertheless, it will be understood that various modifications may be made without departing from the spirit and scope of the invention. For example, a number of the function steps described above may be performed in a different order without substantially affecting overall processing. Further, checkpointing an compute point processing may be combined as desired (e.g., compute points may be generated fairly frequently, interspersed by less frequent checkpoints). Accordingly, other embodiments are within the scope of the following claims.

What is claimed is:

1. A method for initiating processing of blocks of data within at least one flow of data input to a graph having a plurality of process stages, including at least one subscriber process stage, at least one publisher process stage, and optionally at least one intermediate process stage, the method including:

generating a compute point indicator in response to a trigger event;

propagating the compute point indicator through the graph, from each subscriber process stage through any intermediate process stages to each publisher process stage, as part of the flow of data;

for each process stage, processing a current block of data associated with the process stage in response to receipt by the process stage of at least one compute point indicator from an immediately previous process stage associated with the process stage.

2. The method of claim 1, wherein for each process stage, processing a current block of data associated with the process stage is in response to receipt by the process stage of a compute point indicator from each immediately previous process stage associated with the process stage.

3. The method of claim 1, wherein the trigger event occurs periodically.

4. The method of claim 1, wherein the trigger event is based on an external stimulus.

5. The method of claim 1, wherein the trigger event is based on occurrence of selected data values within or derived from incoming data records in at least one flow of data being processed.

6. The method of claim 1, further including coupling two graphs through a first-in, first-out graph queue.

7. The method of claim 1, further including creating a checkpoint for the graph in response to a checkpoint trigger event.

8. The method of claim 7, further including, for at least one publisher process stage, keeping track of which data has been published by such publisher process stage in response to receipt by such publisher process stage of at least one compute point indicator, so that data is not republished by such publisher process stage if processing restarts from a checkpoint.

9. The method of claim 1, further including automatically synchronizing blocks of data within two or more flows of data input to one of the process stages without the need for communication between process stages or with a controller.

10. A computer program, stored on a computer-readable medium, for initiating processing of blocks of data within at least one flow of data input to a graph having a plurality of process stages, including at least one subscriber process stage, at least one publisher process stage, and optionally at least one intermediate process stage, the computer program comprising instructions for causing a computer to:

generate a compute point indicator in response to a trigger event;

propagate the compute point indicator through the graph, from each subscriber process stage through any intermediate process stages to each publisher process stage, as part of the flow of data;

for each process stage, process a current block of data associated with the process stage in response to receipt by the process stage of at least one compute point indicator from an immediately previous process stage associated with the process stage.

11. The computer program of claim 10, wherein for each process stage, the instructions for causing the computer to process a current block of data associated with the process stage includes instructions for causing the computer to perform such process in response to receipt by the process stage of a compute point indicator from each immediately previous process stage associated with the process stage.

12. The computer program of claim 10, wherein the trigger event occurs periodically.

13. The computer program of claim 10, wherein the trigger event is based on an external stimulus.

14. The computer program of claim 10, wherein the trigger event is based on occurrence of selected data values within or derived from incoming data records in at least one flow of data being processed.

15. The computer program of claim 10, further including instructions for causing the computer to coupled two graphs through a first-in, first-out graph queue.

16. The computer program of claim 10, further including instructions for causing the computer to create a checkpoint for the graph in response to a checkpoint trigger event.

17. The computer program of claim 16, further including, for at least one publisher process stage, instructions for causing the computer to keep track of which data has been published by such publisher process stage in response to receipt by such publisher process stage of at least one compute point indicator, so that data is not republished by such publisher process stage if processing restarts from a checkpoint.

18. The computer program of claim 10, further including instructions for causing the computer to automatically synchronize blocks of data within two or more flows of data input to one of the process stages without the need for communication between process stages or with a controller.

19. A system for initiating processing of blocks of data within at least one flow of data input to a graph having a plurality of process stages, including at least one subscriber process stage, at least one publisher process stage, and optionally at least one intermediate process stage, the system including:

means for generating a compute point indicator in response to a trigger event;

means for propagating the compute point indicator through the graph, from each subscriber process stage through any intermediate process stages to each publisher process stage, as part of the flow of data;

for each process stage, means for processing a current block of data associated with the process stage in response to receipt by the process stage of at least one compute point indicator from an immediately previous process stage associated with the process stage.

20. The system of claim 19, wherein for each process stage, the means for processing a current block of data associated with the process stage includes means for performing such processing in response to receipt by the process stage of a compute point indicator from each immediately previous process stage associated with the process stage.

21. The system of claim 19, wherein the trigger event occurs periodically.

22. The system of claim 19, wherein the trigger event is based on an external stimulus.

23. The system of claim 19, wherein the trigger event is based on occurrence of selected data values within or derived from incoming data records in at least one flow of data being processed.

24. The system of claim 19, further including means for coupling two graphs through a first-in, first-out graph queue.

25. The system of claim 19, further including means for creating a checkpoint for the graph in response to a checkpoint trigger event.

26. The system of claim 25, further including, for at least one publisher process stage, means for keeping track of which data has been published by such publisher process stage in response to receipt by such publisher process stage of at least one compute point indicator, so that data is not republished by such publisher process stage if processing restarts from a checkpoint.

27. The system of claim 19, further including means for automatically synchronizing blocks of data within two or more flows of data input to one of the process stages without the need for communication between process stages or with a controller.

* * * * *